(12) United States Patent
Li et al.

(10) Patent No.: US 11,942,840 B2
(45) Date of Patent: Mar. 26, 2024

(54) SELF-STARTING SYNCHRONOUS RELUCTANCE MOTOR ROTOR, MOTOR, AND COMPRESSOR

(71) Applicant: GREE ELECTRIC APPLIANCES, INC. OF ZHUHAI, Zhuhai (CN)

(72) Inventors: Xia Li, Zhuhai (CN); Bin Chen, Zhuhai (CN); Jinfei Shi, Zhuhai (CN); Yong Xiao, Zhuhai (CN); Qinhong Yu, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 309 days.

(21) Appl. No.: 17/437,262

(22) PCT Filed: Dec. 24, 2019

(86) PCT No.: PCT/CN2019/128067
§ 371 (c)(1),
(2) Date: Sep. 8, 2021

(87) PCT Pub. No.: WO2020/253191
PCT Pub. Date: Dec. 24, 2020

(65) Prior Publication Data
US 2022/0173644 A1    Jun. 2, 2022

(30) Foreign Application Priority Data

Jun. 19, 2019   (CN) .......................... 201910532905.6

(51) Int. Cl.
*H02K 19/14*   (2006.01)
*F04B 35/04*   (2006.01)
*H02K 1/24*    (2006.01)

(52) U.S. Cl.
CPC ............. *H02K 19/14* (2013.01); *H02K 1/246* (2013.01); *F04B 35/04* (2013.01); *H02K 2213/03* (2013.01)

(58) Field of Classification Search
CPC ...... H02K 19/06; H02K 19/103; H02K 19/20; H02K 19/24; H02K 19/14; H02K 1/24;
(Continued)

(56) References Cited

U.S. PATENT DOCUMENTS

| 5,831,367 A | 11/1998 | Fei et al. |
| 7,282,829 B2 | 10/2007 | Jung et al. |

(Continued)

FOREIGN PATENT DOCUMENTS

| CN | 1726629 A | | 1/2006 |
| CN | 108110920 | * | 6/2018 |

(Continued)

OTHER PUBLICATIONS

Extended European Search Report dated Feb. 24, 2022 in European Patent Application 19933449.1, 75 pages.
(Continued)

*Primary Examiner* — Ahmed Elnakib
(74) *Attorney, Agent, or Firm* — Oblon, McClelland, Maier & Neustadt, L.L.P.

(57) ABSTRACT

The present disclosure is related to a self-starting synchronous reluctance motor rotor, a motor and a compressor. The self-starting synchronous reluctance motor rotor includes a rotor core; the rotor core is provided with a plurality of slit grooves; both ends of each of the slit grooves are respectively provided with a filled groove; a first end of the filled groove is provided adjacent to each slit groove, and a second end of the filled groove extends outwards parallel to the d-axis of the rotor core; the second end of the filled groove is provided with at least one bevel edge, so that when the (Continued)

d-axis magnetic flux of the rotor core enters a stator along channels formed at the bevel edges, no abrupt change occurs to the magnetic flux.

17 Claims, 4 Drawing Sheets

(58) Field of Classification Search
CPC ...... H02K 1/246; H02K 2213/03; H02K 1/22; H02K 37/02; F04B 35/04
USPC .......................................................... 310/162
See application file for complete search history.

(56) References Cited

U.S. PATENT DOCUMENTS

| | | | |
|---|---|---|---|
| 2006/0108888 A1 | 5/2006 | Jung et al. | |
| 2017/0237307 A1* | 8/2017 | Gontermann | H02K 15/0012 |
| | | | 310/162 |
| 2019/0157925 A1 | 5/2019 | Kolehmainen et al. | |

FOREIGN PATENT DOCUMENTS

| | | |
|---|---|---|
| CN | 108110920 A | 6/2018 |
| CN | 109328425 A | 2/2019 |
| CN | 109347223 A | 2/2019 |
| CN | 109525049 A | 3/2019 |
| CN | 109586435 A | 4/2019 |
| CN | 110112846 A | 8/2019 |
| CN | 110138117 A | 8/2019 |
| CN | 110149015 A | 8/2019 |
| CN | 209805521 U | 12/2019 |
| CN | 209805523 U | 12/2019 |
| JP | 2001-258222 A | 9/2001 |
| JP | 2002-136074 A | 5/2002 |
| JP | 2005-6416 A | 1/2005 |
| JP | 2005-245052 A | 9/2005 |
| JP | 2015-159706 A | 9/2015 |
| JP | 2017-527247 A | 9/2017 |
| KR | 100876173 * | 7/2008 |
| WO | WO 2018/074561 A1 | 4/2018 |

OTHER PUBLICATIONS

International Search Report dated Mar. 26, 2020 in PCT/CN2019/128067 (with English translation), 6 pages.

Decision to Grant and Search Report dated Oct. 28, 2023 in Chinese Application No. 201910532905.6, citing reference 15 therein (6 pgs).

First Office Action dated Nov. 30, 2023 in corresponding Japanese application No. 2021-553784, citing references 16-18 therein (16 pgs).

* cited by examiner

SELF-STARTING SYNCHRONOUS RELUCTANCE MOTOR ROTOR, MOTOR, AND COMPRESSOR

RELATED DISCLOSURE

The present application claims the right of priority from Chinese patent disclosure filed on Jun. 19, 2019, with application No. 201910532905.6, titled "SELF-STARTING SYNCHRONOUS RELUCTANCE MOTOR ROTOR, MOTOR, AND COMPRESSOR", which is hereby incorporated by reference in its entirety.

TECHNICAL FIELD

The present disclosure relates to a self-starting synchronous reluctance motor rotor, a motor and a compressor.

BACKGROUND

The self-starting synchronous reluctance motor combines the structural characteristics of the induction motor and the reluctance motor. It can be started by squirrel cage induction to generate torque, and the rotor inductance gap can be used to generate reluctance torque to achieve constant speed operation. It can be directly connected to the power supply to achieve starting operation. Compared with an asynchronous starting permanent magnet motor, the self-starting synchronous reluctance motor has no rare earth permanent magnet material, no demagnetization, with low motor cost and good reliability.

An inexpensive and easy-to-start synchronous induction motor and a manufacturing device and method for the synchronous induction motor was provided. The rotor is provided with at least one pair of slit portions formed of two-pole magnetic pole protrusions with a d-axis in one direction in which the magnetic flux easily flows and a q-axis in another direction in which the magnetic flux difficultly flows at 90 degrees, and a plurality of slot portions disposed on the outer circumferential side of the slit portions. The slit portions and the slot portions are filled with conductive material. The slit portions are formed in a linear shape, and the slot portions are arranged radially at equal intervals in a circumferential direction. Therefore, the magnetic flux direction between the slot portions is perpendicular to the radial direction of the rotor surface, and the slot portions prevent the magnetic flux from flowing in the d-axis direction, especially the closer the slot portion is to the q-axis, the more obvious the magnetic flux obstruction of the d-axis is, and the smoother the magnetic flux flow of the q-axis is, so the magnetic flux difference between the d-axis and q-axis is not obvious, the salient pole ratio is not large, and the output and efficiency of the motor are not sufficient. In addition, the slit portions are evenly distributed on the periphery of the rotor, and the interaction between the slit portions and the stator cogging will generate larger torque ripple, causing vibration and noise.

SUMMARY

Based on this, it is necessary to provide a self-starting synchronous reluctance motor rotor, a motor and a compressor to solve the large torque ripple.

In some embodiments it is provided a self-starting synchronous reluctance motor rotor comprising a rotor core provided with a plurality of slit grooves, both ends of each slit groove are respectively provided with a filled groove; a first end of the filled groove is adjacent to each slit groove, and a second end of the filled groove extends outwards parallel to the d-axis of the rotor core; the second end of the filled groove is provided with at least one bevel edge, so that when the d-axis magnetic flux of the rotor core enters a stator along channels formed at the bevel edge, no abrupt change occurs to the magnetic flux.

In some embodiments, the second end of the filled groove is provided with two bevel edges comprising: a first bevel edge arranged on one sidewall of the filled groove far from the shaft hole of the rotor core; the first bevel edge forms a first included angle with the d-axis; and a second bevel edge arranged on one sidewall of the filled groove adjacent to the shaft hole; the second bevel edge forms a second included angle with the d-axis.

In some embodiments, the first bevel edge and the second bevel edge are arranged at a distance in the width direction of the filled groove.

In some embodiments, the first included angle is θ1, where θ1⩾=135°, and/or the second included angle is θ2, where θ2⩽170°.

In some embodiments, the angle of the first included angle and/or the second included angle is gradually increased in a direction away from the d-axis.

In some embodiments, the rotor punching sheet of the rotor core is made of oriented silicon steel sheets, a direction of a maximum magnetic conductivity of the oriented silicon steel sheet is the d-axis direction, and a direction of a minimum magnetic conductivity of the oriented silicon steel sheet is the q-axis direction.

In some embodiments, an independent filled groove is provided adjacent to the outer edge of the rotor core, and the q-axis of the rotor core coincides with the geometric center line of the independent filled groove along the radial direction of the rotor core.

In some embodiments, the sum of the width of the slit groove on any magnetic pole of the rotor core passing through the q-axis and the width of the independent filled groove on the magnetic pole passing through the q-axis is L3, and the distance from the shaft hole of the rotor core to the outer edge of the rotor core is L4, where $0.2 \leqslant L4/L3 \leqslant 0.5$.

In some embodiments, the slit groove and the filled groove corresponding to the two ends thereof form a magnetic barrier layer; a magnetic conductive channel is formed between every two adjacent magnetic barrier layers, and the extension direction of at least one end of the magnetic conductive channel adjacent to the outer edge of the rotor core is parallel to the d-axis.

In some embodiments, both ends of the magnetic conductive channel are provided with straight sections; the extension direction of the straight sections is parallel to the d-axis, and the length of the straight sections is gradually reduced along the direction far from the d-axis.

In some embodiments, the width of the magnetic conductive channel is gradually increased from the q-axis to two sides.

In some embodiments, at least one of the plurality of slit grooves has an arc-shaped structure in the middle of the slit groove, and the two ends of the slit groove have a straight section.

In some embodiments, the distance between adjacent filled grooves is d1, and the minimum width between adjacent magnetic barrier layers is d, where d1⩾d.

In some embodiments, the included angle of the lines respectively connecting two ends of the independent filled groove to the shaft hole of the rotor core is α, where 20°≤ α ≤ 60°.

In some embodiments, the independent filled groove and the filled groove are filled with conductive and non-magnetic material, and the filled conductive and non-magnetic material is short-circuited through end rings at two ends of the rotor core.

In some embodiments, the distance between the sidewall of the independent filled groove adjacent to the outer edge of the rotor core and the outer edge of the rotor core is L1, where 0.5δ≤ L1<δ, and the distance from the filled groove to the slit groove is L2, where 0.5δ≤ L2<δ, δ is the width of the air gap between the stator core and the rotor core.

In some embodiments, the cross section of the shaft hole is elliptical, the long axis of the shaft hole is located on the d-axis, and the short axis of the shaft hole is located on the q-axis of the rotor core.

In some embodiments a motor is provided, which comprises a self-starting synchronous reluctance motor rotor, and the self-starting synchronous reluctance motor rotor is the above-mentioned self-starting synchronous reluctance motor rotor.

In some embodiments an electric compressor is provided, which comprises a self-starting synchronous reluctance motor rotor, and the self-starting synchronous reluctance motor rotor is the above-mentioned self-starting synchronous reluctance motor rotor.

By applying the technical solution of the present disclosure, at least one bevel edge is provided at the second end of the filled groove; accordingly, a cross-sectional area of the second end of the filled groove is reduced, and the width of a magnetic conductive channel formed between two adjacent filled grooves is increased, effectively reducing abrupt change in reluctance of the rotor, therefore effectively reducing a torque ripple of a motor with the rotor, and reducing the iron loss, improving the efficiency of the motor.

BRIEF DESCRIPTION OF THE DRAWINGS

The drawings of the specification, which form a part hereof, serve to provide a In some embodiments understanding of the present disclosure, the exemplary embodiments and the description thereof serve to explain the present disclosure, and are not intended to unduly limit the present disclosure. In the attached drawings.

Figure 1:
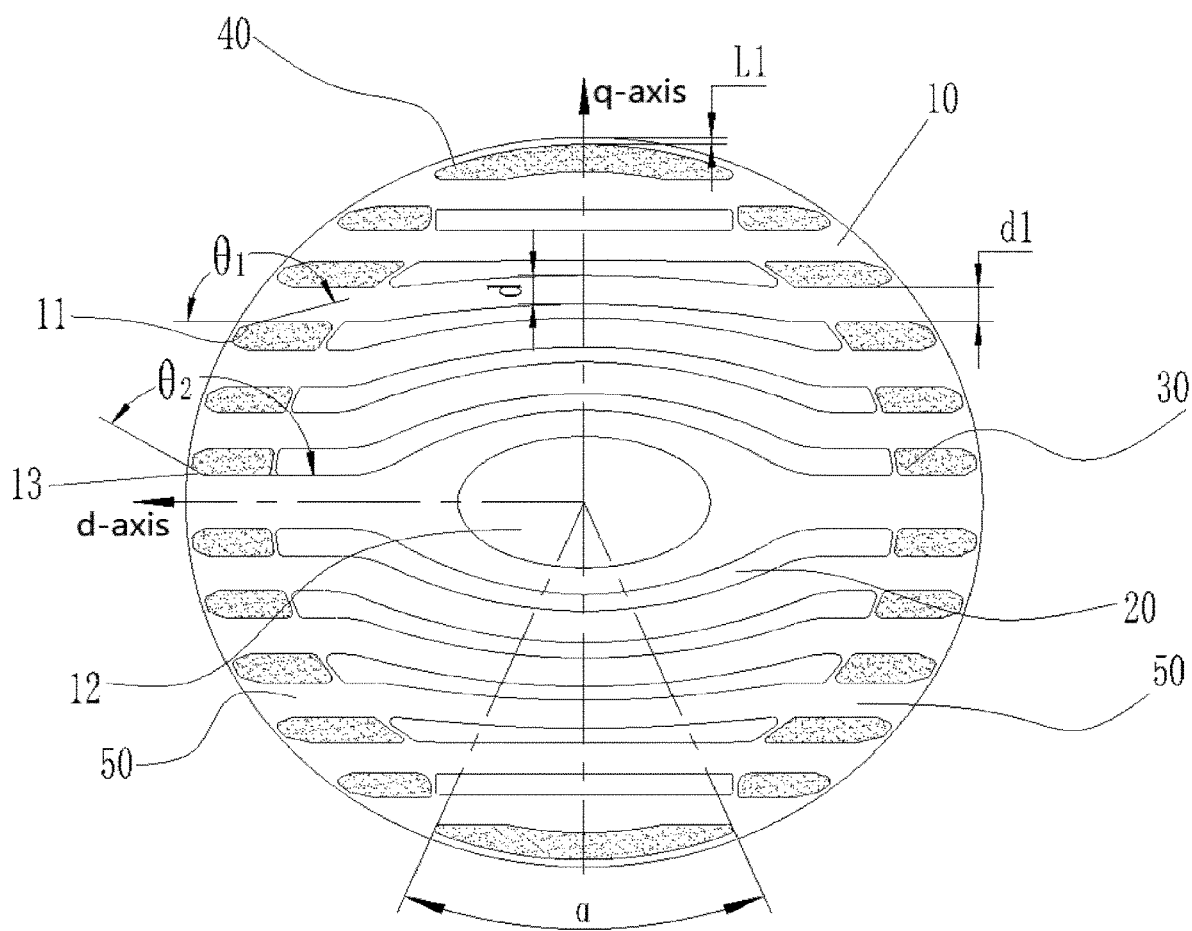
FIG. 1 shows a schematic structural diagram of a self-starting synchronous reluctance motor rotor in some embodiments of the present disclosure.

IN THE FIGURES 10. rotor core; 11. first bevel edge; 12. shaft hole; 13. second bevel edge;
20. slit groove;
30. filled groove;
40. independent filled groove;
50. straight section;
60. end ring.

DETAILED DESCRIPTION

It should be noted that the embodiments in present disclosure and the features in the embodiments can be combined with each other if there is no conflict. Hereinafter, the present disclosure will be described below in detail with reference to the drawings and in conjunction with the embodiments.

It should be noted that the terminology used herein is only for describing specific embodiments, rather than intending to limit the exemplary embodiments according to the present disclosure. As used herein, unless the context clearly indicates otherwise, the singular form is also intended to include the plural form. In addition, it should also be understood that when the terms "comprising" and/or "including" are used in the present specification, it indicates that the presence of features, steps, operations, devices, components, and/or combinations thereof.

It should be noted that the terms "first" and "second" in the present specification, claims and drawings of the present disclosure are used to distinguish similar objects, and are not necessarily used to describe a specific sequence or sequence. It should be understood that the terms used in this way can be interchanged under appropriate circumstances, so that the embodiments of the present disclosure described herein can be implemented in an order other than those illustrated or described herein, for example. In addition, the terms "including" and "having" and any variations thereof are intended to cover non-exclusive inclusions. For example, a process, method, system, product, or device that comprises a series of steps or units is not necessarily limited to those expressly listed. Those steps or units may include other steps or units not clearly listed or inherent to such processes, methods, products, or devices.

For ease of description, spatial relative terms can be used herein, such as "over", "on top of", "above the surface", "above", etc., to describe as shown in the drawing to describe the spatial positional relationship between one device or feature with other devices or features. It should be understood that the spatial relative terms are intended to encompass different orientations in use or operation other than the orientation of the device as depicted in the figure. For example, if a device in the drawing is inverted, then the device described as "above other devices or structures" or "over other devices or structures" will then be positioned as "below other devices or structures" or "under other devices or structures". Thus, the exemplary term "above" can include both orientations "above" and "below". The device can also be positioned in other different ways (rotated by 90 degrees or in other orientations), and the spatial relative description used herein will be explained accordingly.

These exemplary embodiments in accordance with the present disclosure will now be described in greater detail with reference to the drawings. However, these exemplary embodiments can be implemented in a variety of different forms, and should not be construed as limited to the embodiments set forth herein. It should be understood that these embodiments are provided for thorough and complete disclosure of the present disclosure, and to fully convey the concept of these exemplary embodiments to those of ordinary skill in the art. In the drawings, for clarity, the thicknesses of the layers and regions may be enlarged, the same reference signs are used to denote the same devices, thus omitting the description thereof.

Figure 2:
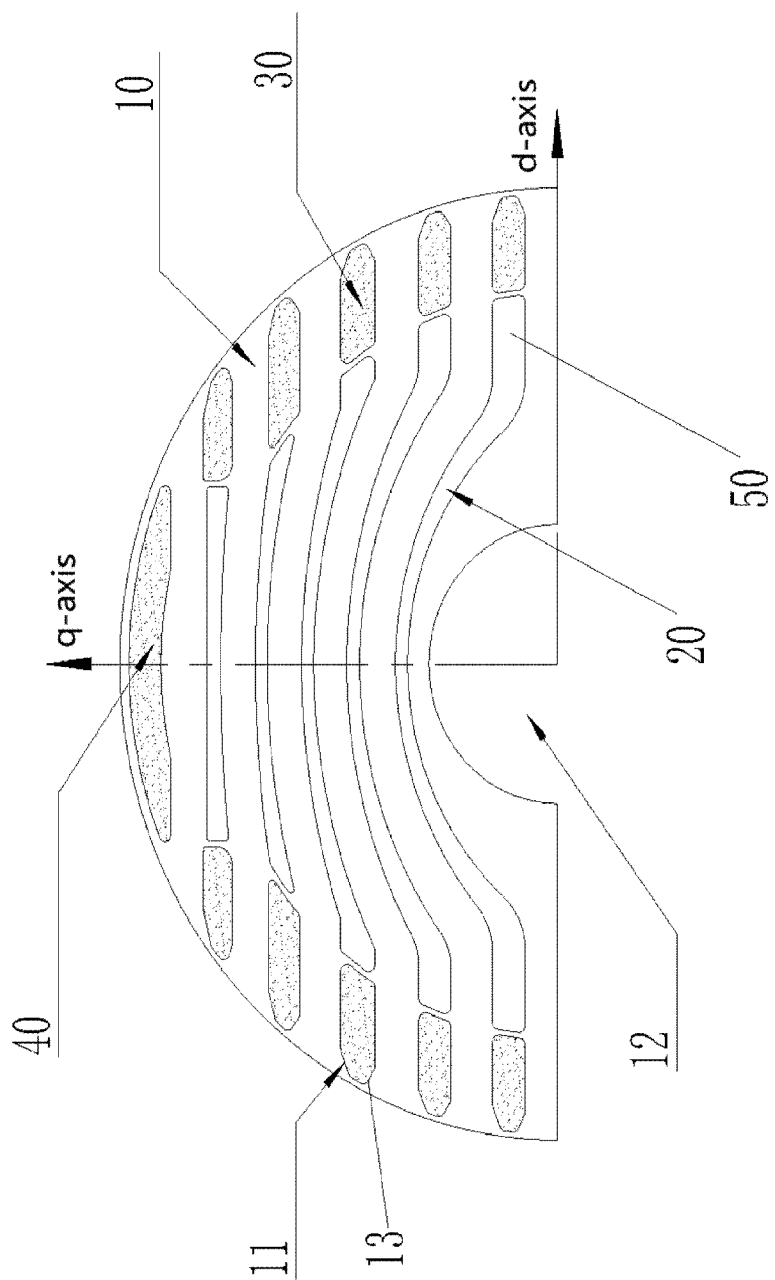
FIG. 2 shows a schematic structural diagram of a self-starting synchronous reluctance motor rotor in some other embodiments of the present disclosure.
Figure 3:
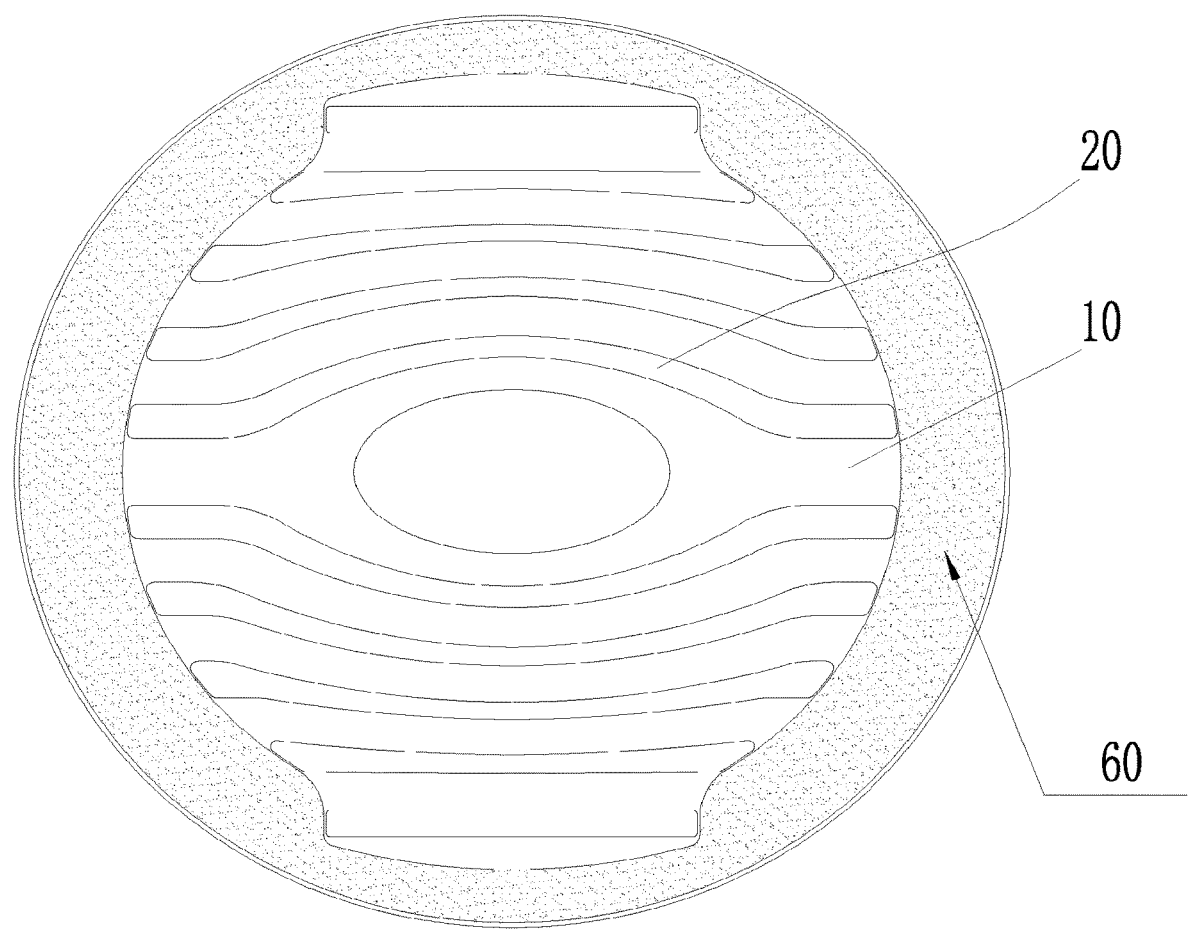
FIG. 3 shows a schematic structural diagram of a self-starting synchronous reluctance motor rotor in some other embodiments of the present disclosure.

As shown in FIGS. 1 to FIG. 3, in some embodiments of the present disclosure, a self-starting synchronous reluctance motor rotor is provided.

As shown in FIG. 1, the rotor comprises a rotor core 10. A plurality of slit grooves 20 are provided on the rotor core 10, and the two ends of each slit groove 20 are respectively provided with a filled groove 30. A first end of the filled groove 30 is provided adjacent to the slit groove 20, and a second end of the filled groove 30 extends outwards parallel to the d-axis of the rotor core 10; the second end of the filled groove 30 is provided with at least one bevel edge, so that when the d-axis magnetic flux of the rotor core 10 enters a stator along channels formed at the bevel edges, no abrupt change occurs to the magnetic flux.

In these embodiments, at least one bevel edge is provided at the second end of the filled groove; accordingly, a cross-sectional area of the second end of the filled groove is reduced, and the width of a magnetic conductive channel formed between two adjacent filled grooves is increased, effectively reducing abrupt change in reluctance of the rotor, therefore effectively reducing a torque ripple of a motor with the rotor, and reducing the iron loss, improving the efficiency of the motor.

As shown in FIG. 1, the second end of the filled groove 30 is provided with two bevel edges which comprise: the first bevel edge 11 arranged on one sidewall of the filled groove 30 far from the shaft hole 12 of the rotor core 10; the first bevel edge 11 forms a first included angle with the d-axis; and the second bevel edge 13 arranged on one sidewall of the filled groove 30 adjacent to the shaft hole 12; the second bevel edge 13 forms a second included angle with the d-axis. Wherein, the first bevel edge 11 and the second bevel edge 13 are arranged at a distance in the width direction of the filled groove 30. The first included angle is $\theta 1$, where $\theta 1 \geq 135°$, and/or the second included angle is $\theta 2$, where $\theta 2 \leq 170°$. Therefore, the magnetic field entering the stator can be gradually reduced, which reduces the torque ripple, and the magnetic flux entering the stator can be increased, which increases the motor torque.

In order to further improve the performance of the rotor and make the motor with the rotor have better efficiency, in some embodiments, the first included angle and the second included angle are set to gradually increase in a direction away from the d-axis. Wherein, the rotor punching sheet of the rotor core 10 is made of oriented silicon steel sheets, a direction of a maximum magnetic conductivity of the oriented silicon steel sheet is the d-axis direction, and a direction of a minimum magnetic conductivity of the oriented silicon steel sheet is the q-axis direction. An independent filled groove 40 is provided adjacent to the outer edge of the rotor core 10, and the q-axis of the rotor core 10 coincides with the geometric center line of the independent filled groove 40 along the radial direction of the rotor core 10.

In some embodiments, the sum of the width of the slit groove 20 on any magnetic pole of the rotor core 10 passing through the q-axis and the width of the independent filled groove 40 on the magnetic pole passing through the q-axis is L3, and the distance from the shaft hole 12 of the rotor core 10 to the outer edge of the rotor core 10 is L4, where $0.2 \leq L4/L3 \leq 0.5$. The slit groove 20 and the filled groove 30 corresponding to the two ends thereof form a magnetic barrier layer. A magnetic conductive channel is formed between every two adjacent magnetic barrier layers, and the extension direction of at least one end of the magnetic conductive channel adjacent to the outer edge of the rotor core 10 is parallel to the d-axis. Therefore, the d-axis magnetic flux can flow smoothly on the d-axis, increasing the inductance gap and improving the reluctance torque. Wherein, as shown in FIG. 1, both ends of the magnetic channel are parallel to the upper line of the d-axis.

As shown in FIG. 1, both ends of the magnetic conductive channel are provided with straight sections 50; the extension direction of the straight sections 50 is parallel to the d-axis, and the length of the straight sections 50 is gradually reduced along the direction far from the d-axis. The width of the magnetic conductive channel is gradually increased from the q-axis to two sides.

In some embodiments, at least one of the plurality of slit grooves 20 has an arc-shaped structure in the middle of the slit groove, and the two ends of the slit groove 20 with arc-shaped structure have a straight section. The distance between adjacent filled grooves 30 is d1, and the minimum width between adjacent magnetic barrier layers is d, where $d1 \geq d$. As shown in FIG. 1, the included angle of the lines respectively connecting two ends of the independent filled groove 40 to the shaft hole 12 of the rotor core 10 is $\alpha$, where $20° \leq \alpha \leq 60°$. The independent filled groove 40 and the filled groove 30 are filled with conductive and non-magnetic material, and the filled conductive and non-magnetic material is short-circuited through end rings 60 at two ends of the rotor core 10. The distance between the sidewall of the independent filled groove 40 adjacent to the outer edge of the rotor core and the outer edge of the rotor core 10 is L1, where $0.5\delta \leq L1 < \delta$, and the distance from the filled groove 30 to the slit groove 20 is L2, where $0.5\delta \leq L2 < \delta$, $\delta$ is the width of the air gap between the stator core and the rotor core 10. Wherein, the cross section of the shaft hole 12 is elliptical, the long axis of the shaft hole 12 is located on the d-axis, and the short axis of the shaft hole 12 is located on the q-axis of the rotor core 10. In some other embodiments, as shown in FIG. 2, the cross section of the shaft hole 12 presents as a circular structure.

The rotor in the above embodiment can also be used in the technical field of electrical equipment, in some embodiments, a motor is provided, which comprises the self-starting synchronous reluctance motor rotor in the above-mentioned embodiments.

The rotor in the above embodiment can also be used in the technical field of compressor equipment, in some embodiments, a compressor is provided, which comprises the self-starting synchronous reluctance motor rotor in the above-mentioned embodiments. Indeed, such rotor can also be applied to the technical field of fans and air compressor equipment.

Adopting the self-starting synchronous reluctance motor rotor of the present disclosure solves low efficiency of asynchronous motors and changes in rotating speed along with the load. By adopting such rotor, the cost is low, the reliability is high, and the high-efficiency constant rotating speed operation can be realized. The outer end portion of the filled groove is designed into a bevel edge by means of corner cutting, which effectively reduces the abrupt change of the reluctance, reduces the torque ripple of the motor, while reduces the iron loss and improves the efficiency of the motor. Reducing the obstacle of the filled groove (slot portion) to the rotor d-axis magnetic flux in the prior art, while adopting oriented silicon steel material to make the d-axis magnetic direction of the rotor consistent with a magnetic direction of the oriented silicon steel material, and increasing the difference of the magnetic flux of the d-axis and q-axis, improving the output power and efficiency of the motor.

The outer end portion of the filled groove is designed by means of corner cutting, which effectively reduces the abrupt change of the reluctance, reduces the torque ripple of the motor, while reduces the iron loss and improves the efficiency of the motor. It enables the magnetic flux to gradually transit into the stator through the bevel edge during the rotation of the rotor, which slows down abrupt changes in the magnetic flux and reduces the torque ripple. In addition, the incision ensures that the effective d-axis magnetic flux enters the stator to generate torque without increasing magnetic flux leakage. The rotor is made of oriented silicon steel sheet. A direction of a maximum magnetic conductivity of the silicon steel sheet is the d-axis direction of the rotor, and a direction of a minimum magnetic conductivity of the silicon steel sheet is the q-axis direction of the rotor. The inductance difference of the motor is enlarged by utilizing the material characteristics, increasing the reluctance torque of the motor. Meanwhile, an elliptical shaft hole is used to reduce the arc of the magnetic barrier, so that the channel between the magnetic barriers tends to be more linear, and the optimal utilization of the oriented silicon steel sheet is realized.

Wherein, the rotor is formed by axially laminating rotor punching sheet with a specific structure. The rotor punching sheet is provided with filled grooves and slit grooves, and a shaft hole 12 matching the rotating shaft. The filled grooves and the slit grooves together form a multi-layer magnetic barrier structure of the rotor, the space between adjacent magnetic barrier layers is the magnetic flux flow channel of the rotor, wherein the corners of both edges of the outer end portion of the filled groove are cut. The included angles between the two cutting edges and the horizontal edge parallel to the d-axis are θ1 and θ2 respectively. The angles θ1 and θ2 gradually increase along with the direction of the filled groove away from the d-axis, that is, the farther the filled groove is from the d-axis, the bigger the included angles between the two cutting edges at the outer end portion of the filled groove and the horizontal edge parallel to the d-axis are. The angles θ1 and θ2 satisfy θ1⩾135° or θ2 ⩽170°. In some embodiments, 145°⩽θ1 or θ2⩽165°. It enables the magnetic flux to gradually transit into the stator through the incision during the rotation of the rotor, which slows down abrupt changes in the magnetic flux and reduces the torque ripple. In addition, the incision ensures that the effective d-axis magnetic flux enters the stator to generate torque without increasing magnetic flux leakage.

The rotor punching sheet is made of oriented silicon steel sheet, wherein a direction of a maximum magnetic conductivity of the silicon steel sheet is the d-axis direction of the rotor, and a direction of a minimum magnetic conductivity of the silicon steel sheet is the q-axis direction of the rotor. The purpose is to enlarge the inductance difference of the motor by utilizing the material characteristics, increasing the reluctance torque of the motor, reducing the iron loss of the motor rotor and improving the efficiency of the motor. In some embodiments, the ratio of the width of the rotor magnetic barrier portion composed of the filled groove and the slit groove in the q-axis direction to the distance between the outer circle of the rotor and the shaft hole can be from 0.2 to 0.5. In some embodiments, the ratio is from 0.3 to 0.4. The purpose is to select a reasonable magnetic barrier ratio, which not only ensures sufficient magnetic barrier width, effectively obstructs the q-axis magnetic flux, but also ensures a reasonable magnetic flux channel to prevent magnetic flux saturation, and increases the d-axis magnetic flux, enlarging the salient pole ratio of the motor, increasing the reluctance torque of the motor and optimizing the output torque of the motor.

The rotor magnetic conductive channel between the rotor magnetic barrier layer composed of the filled groove and the slit groove is parallel to a direction of a maximum magnetic conductivity of the silicon steel sheet near the outer edge of the rotor. The closer the rotor magnetic conductive channel between the rotor magnetic barrier layer is to the d-axis, the longer the length of the magnetic conductive channel parallel to a direction of a maximum silicon steel sheet magnetic conductivity, in order to make the d-axis magnetic flux flow unimpeded.

The width of the rotor magnetic flux channel between the rotor magnetic barrier layers composed of the filled groove and the slit groove is the narrowest at the position of the q-axis, and the width of the magnetic flux channel from the q-axis to both edges of the outer circle of the rotor gradually transits to the maximum. The purpose is to optimize the d-axis magnetic flux channel, increase the magnetic flux in the d-axis direction, increase the difference between the d-axis and q-axis magnetic flux, generate greater reluctance torque, and increase the output torque and efficiency of the motor. The slit groove is composed of a straight line part adjacent to the outer circle of the rotor and a corresponding arc line section part. The closer the slit groove is to the shaft hole, the larger the radian of the arc line section is. Transitioning from the shaft hole position to the outer circumference of the rotor, the radian of the arc line section is gradually reduced, and even becomes a straight line. This design takes into account the position of the rotor shaft hole, and the space in the d-axis direction and the q-axis direction of the rotor is reasonably utilized to make the d-axis magnetic flux flow channel as smooth as possible, while blocking the q-axis magnetic flux flow channel to optimize the use of the rotor space to improve inductance difference of the d-axis and q-axis of the rotor, making the motor performance better.

In some embodiments, the relationship between the width d1 between adjacent filled grooves and the minimum width d between the corresponding magnetic barrier layers should satisfy d1⩾d. can ensure that the magnetic flux channel in the d-axis direction will not be oversaturated and avoid supersaturation that hinders the flow of d-axis magnetic flux. Independent filled grooves are also provided on the periphery of the rotor, which are located in the q-axis direction of the rotor and symmetrically distributed on both sides of the d-axis. The included angle between the two ends of the independent filled grooves in the q-axis direction and the line of the center of the circle is α whose angle range should satisfy 20°⩽α⩽60°, in some embodiments, 40°⩽α⩽50°.

On one hand, this design can increase the number of magnetic barrier layers of the rotor and increase the salient pole difference; on the other hand, it can improve the starting performance of the motor.

Both the filled groove and the independent filled groove are filled with conductive and non-magnetic materials, and the end rings 60 at both ends of the rotor realize self-short circuit, forming a squirrel cage structure, and realizing the self-starting function.

The distance from the filled groove and the independent filled groove to the outer surface of the rotor core is L1, and the distance between the filled groove 2 and the slit groove is L2. L1 and L2 should respectively meet the requirements that 0.5δL1<δ, 0.5δ⩽L2<δ, wherein δ is the width of the air gap between the stator core and the rotor core. This design can reduce the amount of magnetic flux leakage in the rotor part of the motor while ensuring the mechanical strength of the rotor and improving the performance of the motor.

The shape of the shaft hole is not limited to the shape of a round hole. In some embodiments, the shaft hole 5 is designed to be elliptical or a shape similar to elliptical. The long axis of the shaft hole of the elliptical shape or the shape similar to elliptical is arranged in the d-axis direction of the rotor, and the short axis thereof is arranged in the q-axis direction of the rotor. The elliptical shaft hole design reduces the arc of the magnetic barrier in order to match the characteristics of the oriented silicon steel material, so that the channel between the magnetic barriers tends to be more straight, and the oriented silicon steel sheet is utilized optimally.

Figure 4:
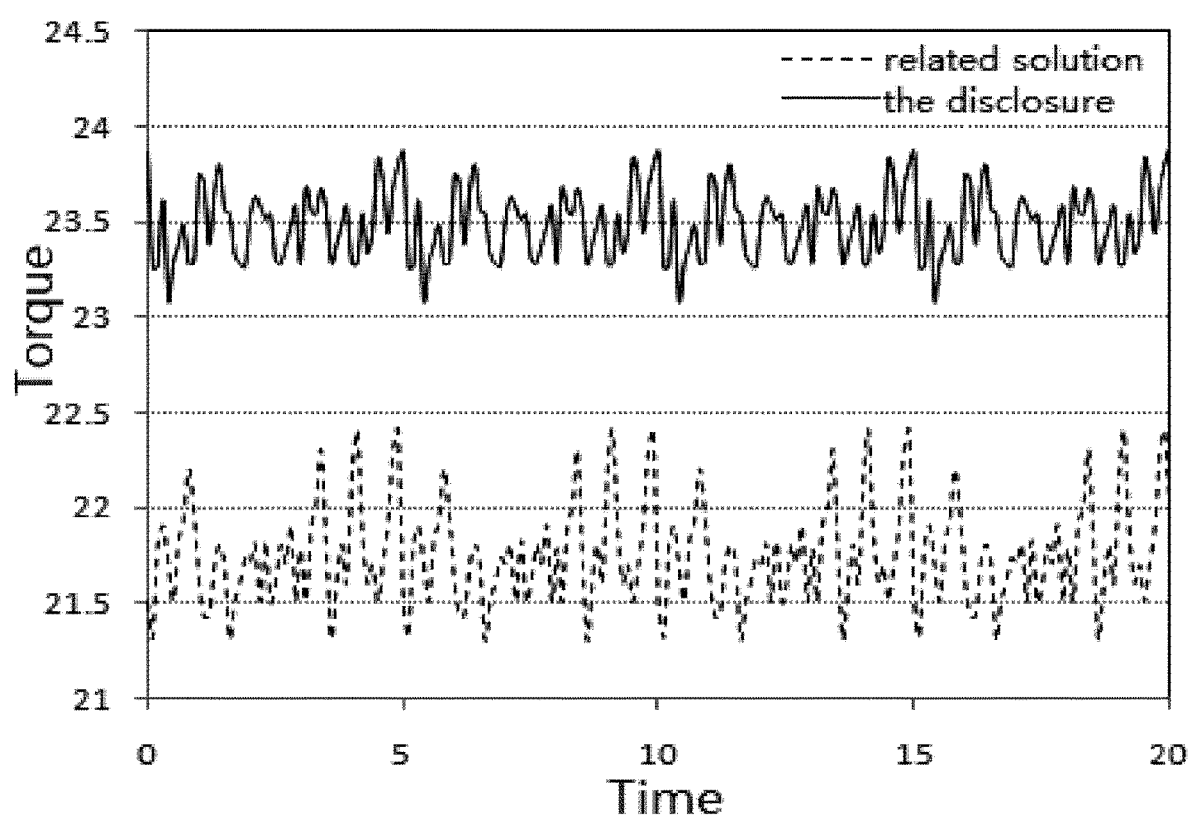
FIG. 4 shows a torque comparison diagram of a self-starting synchronous reluctance motor rotor in some embodiments of the present disclosure and the related solution.

As shown in FIG. 4, a torque comparison diagram between the rotor of the present disclosure and the prior art, the rotor of the present disclosure can effectively increase the output torque of the motor, so that the performance of the motor is better, while the torque ripple of the motor and the iron loss are reduced.

In addition to the above, it should be noted that the "one embodiment", "another embodiment", "embodiment", etc., as referred to in the present specification refer to specific features, structures, or characteristics described in conjunction with the embodiment, that include the presence of like expressions throughout the specification in at least one embodiment of the generic description of the present disclosure. The occurrence of the same expression in multiple places in the specification does not necessarily refer to the same embodiment. In some embodiments, when describing a specific feature, structure, or characteristic in combination with any embodiment, it is claimed that the combination of other embodiments to realize such a feature, structure, or characteristic also falls within the scope of the present disclosure.

In the above-mentioned embodiments, the description of each embodiment has its own emphasis. For parts that are not described in detail in some embodiment, reference may be made to related descriptions of other embodiments.

The foregoing descriptions are only preferred embodiments of the present disclosure rather than limiting the present disclosure. For those of skill in the art, the present disclosure can be in various modifications and changes. Any modification, equivalent replacement, improvement, etc., made within the spirit and principle of the present disclosure shall be included within the protection scope of the present disclosure.

The invention claimed is:

1. A self-starting synchronous reluctance motor rotor, comprising:
   a rotor core provided with a plurality of slit grooves, wherein both ends of each slit groove are respectively provided with a filled groove, a first end of the filled groove is adjacent to the slit groove, and a second end of the filled groove extends outwards parallel to a d-axis of the rotor core, the second end of the filled groove is provided with at least one bevel edge, so that when a d-axis magnetic flux of the rotor core enters a stator along channels formed at the bevel edge, no abrupt change occurs to the d-axis magnetic flux,
   wherein the second end of the filled groove is provided with two bevel edges, and the two bevel edges comprise:
   a first bevel edge arranged on one sidewall of the filled groove far from a shaft hole of the rotor core, wherein the first bevel edge forms a first included angle with the d-axis; and
   a second bevel edge arranged on one sidewall of the filled groove adjacent to the shaft hole, wherein the second bevel edge forms a second included angle with the d-axis, and
   wherein the first included angle is $\theta 1$, where $\theta 1 \geq 135°$, and the second included angle is $\theta 2$, where $\theta 2 \leq 170°$.

2. The self-starting synchronous reluctance motor rotor of claim 1, wherein the first bevel edge and the second bevel edge are arranged at a distance in a width direction of the filled groove.

3. The self-starting synchronous reluctance motor rotor of claim 1, wherein at least one of the first included angle or the second included angle is gradually increased in the direction away from the d-axis.

4. The self-starting synchronous reluctance motor rotor of claim 1, wherein a rotor punching sheet of the rotor core is made of oriented silicon steel sheets, a direction of a maximum magnetic conductivity of the oriented silicon steel sheet is the d-axis direction, and a direction of a minimum magnetic conductivity of the oriented silicon steel sheet is a q-axis direction.

5. The self-starting synchronous reluctance motor rotor of claim 1, wherein an independent filled groove is provided adjacent to an outer edge of the rotor core, and a q-axis of the rotor core coincides with a geometric center line of the independent filled groove along a radial direction of the rotor core.

6. The self-starting synchronous reluctance motor rotor of claim 5, wherein a sum of a width of the slit groove on any magnetic pole of the rotor core passing through the q-axis and the width of the independent filled groove on the magnetic pole passing through the q-axis is L3, and a distance from a shaft hole of the rotor core to the outer edge of the rotor core is L4, where $0.25 \leq L4/L3 \leq 0.5$.

7. The self-starting synchronous reluctance motor rotor of claim 5, wherein an included angle of lines respectively connecting two ends of the independent filled groove to a shaft hole of the rotor core is $\alpha$, where $20° \leq \alpha \leq 60°$.

8. The self-starting synchronous reluctance motor rotor of claim 5, wherein the independent filled groove and the filled groove are filled with conductive and non-magnetic material, and the filled conductive and non-magnetic material is short-circuited through end rings at two ends of the rotor core.

9. The self-starting synchronous reluctance motor rotor of claim 5, wherein the distance between a sidewall of the independent filled groove adjacent to the outer edge of the rotor core and the outer edge of the rotor core is L1, where $0.5\delta \leq L1 < \delta$, and the distance from the filled groove to the slit groove is L2, where $0.5\delta \leq L2 < \delta$, $\delta$ is the width of an air gap between the stator core and the rotor core.

10. The self-starting synchronous reluctance motor rotor of claim 1, wherein the slit groove and the filled groove corresponding to two ends thereof form a magnetic barrier layer, a magnetic conductive channel is formed between every two adjacent magnetic barrier layers, and an extension direction of at least one end of the magnetic conductive channel adjacent to an outer edge of the rotor core is parallel to the d-axis.

11. The self-starting synchronous reluctance motor rotor of claim 10, wherein both ends of the magnetic conductive channel are provided with straight sections, and the extension direction of the straight sections is parallel to the d-axis, and a length of the straight sections is gradually reduced along the direction far from the d-axis.

12. The self-starting synchronous reluctance motor rotor of claim 10, wherein a width of the magnetic conductive channel is gradually increased from a q-axis to two ends of the magnetic conductive channel.

13. The self-starting synchronous reluctance motor rotor of claim 10, wherein a distance between adjacent filled grooves is d1, and the minimum width between adjacent magnetic barrier layers is d, where d1≥d.

14. The self-starting synchronous reluctance motor rotor of claim 1, wherein at least one of the plurality of slit grooves has an arc-shaped structure in the middle of the slit groove, and the two ends of the slit groove have a straight section.

15. The self-starting synchronous reluctance motor rotor of claim 1, wherein a cross section of the shaft hole is elliptical, a long axis of the shaft hole is located on the d-axis, and a short axis of the shaft hole is located on a q-axis of the rotor core.

16. A motor comprising the self-starting synchronous reluctance motor rotor of claim 1.

17. A compressor comprising the self-starting synchronous reluctance motor rotor of claim 1.

* * * * *